(12) United States Patent
Noumi et al.

(10) Patent No.: US 9,077,025 B2
(45) Date of Patent: Jul. 7, 2015

(54) METHOD FOR PRODUCTION OF POROUS FILM, POROUS FILM, SEPARATOR FOR NON-AQUEOUS ELECTROLYTE BATTERY, AND NON-AQUEOUS ELECTROLYTE BATTERY USING THE SEPARATOR

(75) Inventors: Shunsuke Noumi, Osaka (JP); Tomoaki Ichikawa, Osaka (JP); Shinichi Ooizumi, Osaka (JP); Yoshihiro Uetani, Osaka (JP); Masaki Ujihara, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 12/601,498

(22) PCT Filed: May 23, 2008

(86) PCT No.: PCT/JP2008/059589
§ 371 (c)(1),
(2), (4) Date: Apr. 15, 2010

(87) PCT Pub. No.: WO2008/146758
PCT Pub. Date: Dec. 4, 2008

(65) Prior Publication Data
US 2010/0227223 A1  Sep. 9, 2010

(30) Foreign Application Priority Data
May 24, 2007  (JP) .................. 2007-137611

(51) Int. Cl.
| H01M 2/16 | (2006.01) |
| B29C 55/00 | (2006.01) |
| B29C 71/04 | (2006.01) |
| C08J 7/12 | (2006.01) |
| H01M 2/14 | (2006.01) |
| B29C 35/08 | (2006.01) |
| B29K 23/00 | (2006.01) |
| B29K 105/04 | (2006.01) |
| H01M 10/052 | (2010.01) |

(52) U.S. Cl.
CPC .......... *H01M 2/1653* (2013.01); *B29C 55/005* (2013.01); *B29C 71/04* (2013.01); *B29C 2035/0827* (2013.01); *B29K 2023/0683* (2013.01); *B29K 2105/04* (2013.01); *C08J 7/123* (2013.01); *C08J 2323/02* (2013.01); *H01M 2/145* (2013.01); *H01M 10/052* (2013.01)

(58) Field of Classification Search
USPC .............................. 429/231.95, 254; 264/479
See application file for complete search history.

(56) References Cited

U.S. PATENT DOCUMENTS

| 5,723,388 A * | 3/1998 | Kobayashi et al. ........... 442/170 |
| 6,080,507 A | 6/2000 | Yu |

(Continued)

FOREIGN PATENT DOCUMENTS

| JP | 63-205048 A | 8/1988 |
| JP | 1-258358 A | 8/1989 |

(Continued)

*Primary Examiner* — Cynthia H Kelly
*Assistant Examiner* — Monique Wills
(74) *Attorney, Agent, or Firm* — Hamre, Schumann, Mueller & Larson, P.C.

(57) ABSTRACT

The method for producing a porous film of the present invention includes producing a stretched film by stretching a resin sheet containing at least polyolefin, and then irradiating the stretched film with a vacuum ultraviolet ray. The separator for a non-aqueous electrolyte battery of the present invention is composed of the porous film obtained by the production method of the present invention. The non-aqueous electrolyte battery of the present invention is provided with the separator for a non-aqueous electrolyte battery of the present invention.

7 Claims, 2 Drawing Sheets

(56) References Cited

U.S. PATENT DOCUMENTS

| | | | |
|---|---|---|---|
| 6,858,115 B2* | 2/2005 | Azuma et al. | 204/192.11 |
| 2009/0068530 A1* | 3/2009 | Hiraoka et al. | 429/33 |
| 2009/0098450 A1 | 4/2009 | Kikuchi et al. | |
| 2009/0148762 A1* | 6/2009 | Kasamatsu et al. | 429/145 |
| 2009/0286161 A1* | 11/2009 | Takita et al. | 429/249 |
| 2010/0196702 A9* | 8/2010 | Furukawa | 428/336 |
| 2010/0227223 A1* | 9/2010 | Noumi et al. | 429/254 |

FOREIGN PATENT DOCUMENTS

| | | |
|---|---|---|
| JP | 6-098395 A | 4/1994 |
| JP | 7-118430 A | 5/1995 |
| JP | 7-278330 A | 10/1995 |
| JP | 9-031227 A | 2/1997 |
| JP | 9-216964 A | 8/1997 |
| JP | 10-007831 A | 1/1998 |
| JP | 10-284041 | 10/1998 |
| JP | 11-329390 A | 11/1999 |
| JP | 2000-230072 A | 8/2000 |
| JP | 2001-059036 A | 3/2001 |
| JP | 2002-161165 A | 6/2002 |
| JP | 2002-265657 | 9/2002 |
| JP | 2002-367590 A | 12/2002 |
| JP | 2003-11913 A | 4/2003 |
| WO | 2007/049568 | 5/2007 |

* cited by examiner

METHOD FOR PRODUCTION OF POROUS FILM, POROUS FILM, SEPARATOR FOR NON-AQUEOUS ELECTROLYTE BATTERY, AND NON-AQUEOUS ELECTROLYTE BATTERY USING THE SEPARATOR

TECHNICAL FIELD

The present invention relates to a method for producing a porous film containing polyolefin, a separator for a non-aqueous electrolyte battery composed of the porous film, and a non-aqueous electrolyte battery provided with the separator for a non-aqueous electrolyte battery.

BACKGROUND ART

Non-aqueous electrolyte batteries, such as lithium ion batteries, have a high energy density and little self-discharge, and thereby they have been used more widely along with the demand for electronic apparatuses with higher performance and a smaller size. As an electrode for such a non-aqueous electrolyte battery, a spirally-wound body with a broad effective electrode area is used. The spirally-wound body is obtained by stacking a positive electrode, a negative electrode, and a separator, each having a strip-like shape, and winding the stack of them.

Basically, the separator serves to prevent the two electrodes from being short-circuited. Also, with a micro porous structure, the separator allows ions to permeate therethrough to cause a cell reaction. On the other hand, the separator having a so-called shutdown function (SD function) is used from the viewpoint of improving the safety. The SD function is a function to stop the cell reaction by deforming the resin thermally to close the micropores with an increased temperature inside the battery, when an abnormal current flow occurs due to an erroneous connection, etc. As the separator with the SD function, a polyolefin microporous film is known, for example.

However, conventional polyolefin microporous films have a safety problem because they have a low melting point and their mechanical strengths are lowered at a high temperature. In order to solve this problem, there has been proposed a method in which a polyolefin microporous film is stacked with a heat-resistant support body (JP 1 (1989)-258358 A), and a method in which a resin component is crosslinked to increase the heat resistance (JP 63 (1988)-205048 A), for example.

As the crosslinking system in the polyolefin microporous film, there have been known a method in which an active silane group is introduced to uncrosslinked polyolefin so that polyolefin is crosslinked by a crosslinking reaction between the active silane group and water (JP 9 (1997)-216964 A), a method in which the polyolefin microporous film is heat-treated in the presence of oxygen (JP 2002-161165 A), a method in which the polyolefin microporous film is irradiated with an ionizing radiation, such as an electron beam (JP 10 (1998)-7831 A), and a method in the polyolefin microporous film is irradiated with an ultraviolet ray (JP 2003-119313 A), for example. Particularly, the method of ultraviolet ray irradiation is used widely in the industries because it is fast, usable in a wide range of applications, and needs no large-scale facilities.

However, when polyolefin is highly crosslinked, the polyolefin loses its flowability at a temperature higher than the melting point of polyolefin, making the shutdown function insufficient. Thus, the degree of crosslinking must be limited to enhance safety, and there was a problem in using the highly-crosslinked polyolefin microporous film as the separator for a battery.

On the other hand, the separator for a battery also is required to have mechanical strength so as to prevent a through-crack from being formed therein by projections and depressions of the electrode and foreign matters. As the method for increasing the mechanical strength of the polyolefin microporous film, there have been proposed a method in which the polyolefin microporous film is stretched at a high stretching ratio (JP 2002-367590 A), and a method in which ultra high molecular weight polyethylene is mixed in the microporous film (JP 7 (1995)-118430 A). However, in the microporous films obtained by these methods, polyethylene is stretched fully and comes to have a crystal structure. This causes a problem such that the melting point of the microporous film is raised and the shutdown temperature is raised accordingly, and the high melt viscosity of the microporous film hinders a prompt shutdown.

As described above, it was difficult to attain all of the shutdown function, the heat resistance, and the mechanical strength. In order to attain these properties sufficiently, there have been proposed methods in which a plurality of porous films with different characteristics are stacked (JP 6 (1994)-98395 A and JP 11 (1999)-329390 A). However, these methods have problems such that they require a complicated manufacturing process, and that they increase the thickness of the porous film, lowering the battery capacity per volume.

DISCLOSURE OF THE INVENTION

The present invention is intended to provide a method for producing, with high productivity, a porous film that has an excellent shutdown function, excellent heat resistance, and excellent mechanical strength and is easy to make thinner. The present invention also is intended to provide a separator for a non-aqueous electrolyte battery composed of the porous film, and a non-aqueous electrolyte battery provided with the separator for a non-aqueous electrolyte battery.

The present inventors have found that the above-mentioned objects can be achieved by the following production method.

The method for producing the porous film of the present invention includes producing a stretched film by stretching a resin sheet containing at least polyolefin, and then irradiating the stretched film with a vacuum ultraviolet ray. The vacuum ultraviolet ray is an ultraviolet ray with a wavelength shorter than 200 nm.

The porous film of the present invention is a porous film produced by the production method of the present invention.

The method for producing the porous film of the present invention makes it possible to produce a porous film that has an excellent shutdown function, excellent heat resistance, and excellent mechanical strength and is easy to make thinner. It seems that the vacuum ultraviolet ray irradiation applied to the stretched film cuts selectively molecular chains only in the resin in a surface area of the stretched film, and thus the molecular weight and the degree of crosslinking of the resin are lowered, lowering the melting point and the melt viscosity of the resin. As a result, it seems that the heat resistance and the mechanical strength can be maintained in an internal area of the porous film, and the shutdown function is enhanced in the surface area of the porous film.

The separator for a non-aqueous electrolyte battery of the present invention is composed of the porous film of the present invention.

The non-aqueous electrolyte battery of the present invention is provided with the separator for a non-aqueous electrolyte battery of the present invention.

Since the separator for a non-aqueous electrolyte battery of the present invention is composed of the porous film produced by the above-mentioned production method of the present invention, it has excellent permeability, an excellent shutdown function, and excellent mechanical strength as well as excellent resistance to film rupture at a high temperature. Particularly, it suitably can be used for high-performance batteries. In this way, the non-aqueous electrolyte battery of the present invention provided with the separator for a non-aqueous electrolyte battery is a high-performance battery with an excellent safety, and can be used for various applications.

BEST MODE FOR CARRYING OUT THE INVENTION

Figure 1:
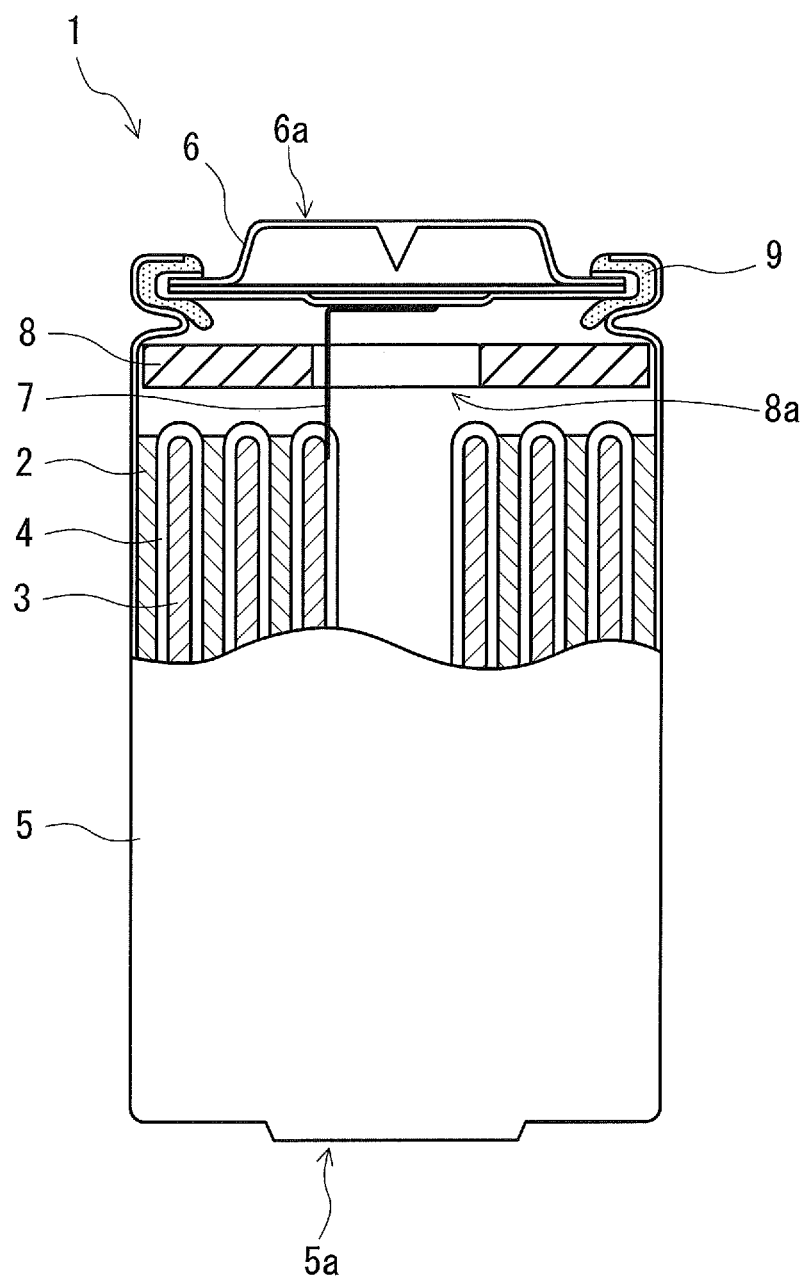
FIG. 1 is a partial cross-sectional view showing a structural example of the non-aqueous electrolyte battery of the present invention.

The porous film of the present invention is produced by producing a stretched film by stretching a resin sheet containing at least polyolefin, and then irradiating the stretched film with a vacuum ultraviolet ray. The porous film produced by this method has an excellent shutdown function, excellent heat resistance, and excellent mechanical strength and is easy to make thinner.

Preferably, an $Xe_2$ excimer UV lamp is used as a light source for the irradiation with the vacuum ultraviolet ray. Use of the $Xe_2$ excimer UV lamp (with an oscillation wavelength of 172 nm) makes it possible to cut appropriately the molecular chains only in the resin in the surface area of the stretched film. Thereby, the shutdown temperature can be adjusted easily.

Preferably, the resin sheet contains 10 wt % or more of ultra high molecular weight polyethylene with a weight average molecular weight of 800,000 or more with respect to a total resin component in the resin sheet. Use of 10 wt % or more of ultra high molecular weight polyethylene with a weight average molecular weight of 800,000 or more increases the heat resistance and the mechanical strength of the porous film. The content of the ultra high molecular weight polyethylene with a weight average molecular weight of 800,000 or more in the resin sheet may be 100 wt % with respect to the total resin component in the resin sheet. More specifically, the resin component contained in the resin sheet consists of the ultra high molecular weight polyethylene. In the present embodiment, the ultra high molecular weight polyethylene preferably has a weight average molecular weight of 1 million or more.

The resin sheet may contain a polymer with a double bond. When the polymer with a double bond is added, the added polymer can form a crosslinked structure with polyolefin, and the heat resistance and the mechanical strength can be given to the porous film even in a high temperature range exceeding the melting point of polyolefin.

A detailed description will be made with respect to the material for the resin sheet used in the method for producing the porous film of the present invention. As the resin component contained in the resin sheet, at least polyolefin is used. As polyolefin, polyethylene, polypropylene, and polybutene can be mentioned, for example. From the viewpoint of increasing the mechanical strength of the porous film, the content of the ultra high molecular weight polyethylene with a weight average molecular weight of 800,000 or more (preferably 1 million or more) in the resin component preferably is 10 wt % or more, more preferably 30 wt % or more, and particularly preferably 50 wt % or more, and may be 100 wt %. The ultra high molecular weight polyethylene may be a homopolymer, or may be a copolymer containing an alpha-olefin unit, such as propylene, butene, pentene, hexene, and octene, at a ratio of 4 mol % or less. Also, high density polyethylene with a weight average molecular weight of less than 1 million may be used together with the ultra high molecular weight polyethylene.

Modified polyethylene obtained by grafting a polar group onto polyethylene may be blended into the material. Preferably, the polar group is a maleic anhydride residue. Furthermore, a resin in which a principal chain and/or a side chain has a double bond (the polymer with a double bond) may be blended into the material. In this resin, a part of the double bonds may be lost by addition of hydrogen, halogen, etc. Or the resin may be a derivative obtained by substituting a part of hydrogen atoms of the double bonds by other substituents. As the resin, a resin in which a hydrogen atom is bound to the α position of the double bond is preferable. Specifically, polynorbornene, polybutadiene, polyisoprene, natural rubber, acrylonitrile-butadiene rubber, styrene butadiene rubber, EPDM (ethylene propylene diene terpolymer), and polychloroprene can be mentioned, for example. One of these resins may be added, or two or more of them may be added. From the viewpoints of material supply and dispersibility, polynorbornene, polybutadiene, and EPDM are used preferably. As the EPDM, those made by using ethylidene norbornene with an excellent copolymerizability as a raw material are used preferably. Among them, EPDM having a large molecular weight and many residual double bonds is preferable. The addition of these resins can develop a highly crosslinked structure in the porous film, and thereby the heat resistance of the porous film can be increased further.

When these resins (the polymers with a double bond) are added as the resin component of the resin sheet, the addition amount thereof preferably is 1 wt % to 10 wt % in the resin component, and more preferably 2 wt % to 5 wt %.

In order to provide a superior shutdown function, at least one resin selected from the group consisting of polyolefins with a weight average molecular weight of 500,000 or less, thermoplastic elastomer, and a graft copolymer further may be added.

As the polyolefins with a weight average molecular weight of 500,000 or less, there can be mentioned a polyolefin resin such as polyethylene and polypropylene, and a modified polyolefin resin such as an ethylene-acrylic monomer copolymer and an ethylene-vinylacetate copolymer.

As the thermoplastic elastomer, there can be mentioned polystyrene elastomer, polyolefin elastomer, polydiene elastomer, vinyl chloride elastomer, polyester elastomer, polyamide elastomer, and polyurethane elastomer, for example.

The graft copolymer is not particularly limited as long as it has a polyolefin chain. For example, there can be mentioned a graft copolymer in which a principal chain has polyolefin and a side chain has vinyl polymer, etc. immiscible with polyolefin. As a graft component, polyacrylics, polymethacrylics, polystyrene, polyacrylonitrile, and polyoxyalkylenes are preferable. One of these resins can be used, or two or more of them can be used in combination.

When these resins (such as polyolefins with a weight average molecular weight of 500,000 or less) are added as the resin component of the resin sheet, the addition amount thereof preferably is 10 wt % to 90 wt % in the resin component, and more preferably 20 wt % to 50 wt %. An addition amount of 10 wt % or more can provide the porous film with the more excellent shutdown function. An addition amount exceeding 90 wt % tends to lower the mechanical strength of the porous film.

Next, the method for producing the porous film of the present invention will be described.

Known methods, such as a dry film forming method and wet film forming method, can be used for producing the porous film of the present invention. For example, a resin composition containing the resin component is mixed with a solvent, kneaded, and molded into a sheet shape while being heat-melted, and then it is cooled and gelled (solidified) to produce the resin sheet. Then, the resin sheet is roll-pressed, stretched in at least one axial direction, and the solvent is removed therefrom to produce the stretched film. Thereafter, the stretched film is irradiated with the vacuum ultraviolet ray. Thus, the porous film is formed.

As the solvent, there can be mentioned, for example, aliphatic hydrocarbon or cyclic hydrocarbon, such as nonane, decane, undecane, dodecane, decalin, and liquid paraffin, and a mineral oil fraction having a boiling point equivalent to boiling points of these. A non-volatile solvent containing a large amount of alicyclic hydrocarbon, such as liquid paraffin, is preferable.

The content of the resin component in the resin composition preferably is 5 wt % to 30 wt %, and more preferably 10 wt % to 25 wt %. From the viewpoint of increasing the strength of the porous film to be obtained, the content of the resin component preferably is 5 wt % or more. Also, from the viewpoint of dissolving polyolefin in the solvent sufficiently, kneading it to almost a fully-stretched state, and obtaining sufficient entanglement of the polymer chains, the content of the resin component preferably is 30 wt % or less. An additive, such as an antioxidant, an ultraviolet absorber, a colorant, a nucleating agent, a pigment, an antistatic agent, and an inorganic filler, further can be added to the resin composition, if needed, within a range that does not impair the objects of the present invention.

A known method can be used for the process of kneading the mixture of the resin composition and the solvent and molding it into a sheet shape. For example, it is possible to perform a batch-type kneading of the mixture by using a Banbury mixer, a kneader, etc., and then sandwich it between cooled metal plates, cool rapidly, and crystallize it to obtain the resin sheet. Or the resin sheet may be obtained by using an extruder, etc. with a T-slot die, etc. The kneading is not particularly limited as long as it is performed at an appropriate temperature. Preferably, it is performed at 100° C. to 200° C.

The thickness of the resin sheet is not particularly limited, and it preferably is 0.5 mm to 20 mm. It may be 0.5 mm to 3 mm by a roll-pressing treatment, such as heat pressing. The method for the heat pressing is not particularly limited, and a belt press machine described in JP 2000-230072 A preferably can be used. Preferably, the temperature for the roll-pressing treatment is 100° C. to 140° C.

The method for the stretching treatment for the resin sheet is not particularly limited. A common tenter method, rolling method, and inflation method, or a combination of these methods can be used. Moreover, any of methods, such as an uniaxial stretching method and a biaxial stretching method, can be used. In the case of using the biaxial stretching method, any one of simultaneous machine direction-traverse direction stretching and successive machine direction-traverse direction stretching may be performed. From the viewpoint of the uniformity and strength of the film, it is preferable to form the film by simultaneous biaxial stretching. Preferably, the temperature for the stretching treatment is 100° C. to 140° C.

The desolvation treatment is a process for removing the solvent from the stretched resin sheet to form a porous structure, and can be performed, for example, by washing the stretched resin sheet with a washing solvent and removing the residual solvent. As the washing solvent, there can be mentioned an easily-volatile washing solvent, for example, hydrocarbon such as pentane, hexane, heptane, and decane, hydrocarbon chloride such as methylene chloride and carbon tetrachloride, hydrocarbon fluoride such as ethanetrifluoride, ethers such as diethylether and dioxane, alcohols such as methanol and ethanol, and ketones such as acetone and methyl ethyl ketone. One of these may be used or a mixture of two or more of them may be used. The washing method using the washing solvent is not particularly limited. For example, there can be mentioned a method in which the stretched resin sheet is immersed into the washing solvent to extract the residual solvent, and a method in which the washing solvent is showered on the stretched resin sheet.

Thereafter, the obtained stretched film is irradiated with the vacuum ultraviolet ray to produce the porous film. As the light source for applying the vacuum ultraviolet ray (an ultraviolet ray with a wavelength shorter than 200 nm), there can be mentioned a molecular laser, such as an $F_2$ laser (157 nm), a rare gas halide excimer laser such as an ArF laser (193 nm), and a rare gas excimer laser (UV lamp) such as an $Xe_2$ excimer UV lamp (172 nm), an $Xe_2$ excimer laser (172 nm), a $Kr_2$ excimer laser (146 nm), and an Are excimer laser (126 nm), for example. Among these, the $Xe_2$ excimer UV lamp preferably is used.

The amount of irradiation with the vacuum ultraviolet ray preferably is 100 to 5000 mJ/cm$^2$, and more preferably 100 to 1000 mJ/cm$^2$. When the amount of irradiation is less than 100 mJ/cm$^2$, the molecular chains in the resin in the surface area of the stretched film are not cut sufficiently. Thus, the molecular weight and the degree of crosslinking of the resin cannot be lowered sufficiently in some cases. In this case, it may be difficult to lower sufficiently the shutdown temperature in the surface area of the porous film. In contrast, when the amount of irradiation exceeds 5000 mJ/cm$^2$, the molecular chains in the resin in the surface area of the stretched film are cut excessively and the mechanical strength of the porous film is lowered excessively in some cases, which is not preferable.

A crosslinking treatment may be applied to the film simultaneously with or separately from the vacuum ultraviolet ray irradiation. The crosslinking treatment can be performed by a method such as ultraviolet irradiation, electron beam irradiation, and heating. Particularly, the ultraviolet irradiation is preferable. The wavelength of the ultraviolet ray used for the crosslinking treatment is approximately 200 nm to 400 nm. The light source for the ultraviolet ray irradiation is not particularly limited, and a high pressure mercury vapor lamp is used preferably. In order to accelerate the photoreaction, a photoinitiator may be added to the film before the ultraviolet ray irradiation is performed. In the method for producing the porous film of the present invention, the crosslinking treatment is performed, if needed. Thus, it is not necessary to perform the crosslinking treatment when a single film of ultra high molecular weight polyethylene with a weight average molecular weight of 800,000 or more (preferably 1 million or more) is used for the porous film (when the resin component of the resin sheet consists of the ultra high molecular weight polyethylene with a weight average molecular weight of 800,000 or more (preferably 1 million or more), for example.

When the crosslinking treatment is performed, it is desirable to add the photoinitiator to the stretched film or to the stretched film from which the solvent has been removed. The photoinitiator used at this time is not particularly limited, and a benzophenone photoinitiator such as benzophenone and methyl benzoylbenzoate, an alkyl phenon photoinitiator such as benzoin ether, benzyl dimethyl ketal, and α-hydroxyalkyl phenon, and acyl phosphine oxide can be mentioned, for example. As the method for adding the photoinitiator, there can be mentioned a method in which the photoinitiator is kneaded into the resin composition, a method in which a solution containing the photoinitiator is applied to the stretched film, and a method in which the stretched film is immersed into the solution containing the photoinitiator, for example.

Preferably, the concentration of the photoinitiator is 0.01 wt % to 1 wt % in the stretched film. When the concentration is less than 0.01 wt %, the photoreaction is not accelerated sufficiently and the crosslinking density is insufficient. In contrast, when the concentration exceeds 1 wt %, the excessive photoinitiator hinders the penetration of the ultraviolet ray and inhibits the crosslinking reaction. Moreover, the remaining photoinitiator may cause an undesirable side reaction that is an electrode reaction, decreasing the battery capacity.

Preferably, the crosslinking treatment is applied to the stretched film or to the stretched film from which the solvent has been removed. When the crosslinking treatment is applied to the unstretched resin sheet, the sheet tends to rupture easily before a sufficient stretching ratio is achieved in the subsequent stretching process. Moreover, when the stretched film contains a solvent with a high boiling point, such as nonane, decane, undecane, dodecane, decalin, and liquid paraffin, it is preferable to replace the solvent with a solvent having a low boiling point, dry the stretched film, and then apply the crosslinking treatment. It is not preferable for the film to contain a large amount of the solvent because the solvent dilutes the photoinitiator and lowers the reaction efficiency, and the solvent also participates in the photoreaction.

When the resin sheet contains the polymer with a double bond and the crosslinked structure can be formed, it is possible to control the degree of crosslinking in the porous film by the vacuum ultraviolet ray irradiation and the crosslinking treatment. In this case, the degree of crosslinking preferably is 20% to 80% as gel fraction. Applying the crosslinking treatment provides the porous film with a higher strength and a higher heat resistance and increases significantly the resistance to film rupture. A gel fraction of 20% or more makes the crosslinked structure sufficient, increasing further the strength and the resistance to film rupture. In contrast, a gel fraction exceeding 80% lowers the melting flowability of the film and makes it impossible to obtain the sufficient shutdown function in some cases.

Conceivably, the reason why the crosslinking treatment increases the resistance to film rupture at a high temperature is because: a polymer radical generated by the ultraviolet ray irradiation is added to a double bond and a crosslinking reaction occurs between polymers each having a double bond or between the polymer and another resin component; or the loss of the double bond from the principal chain raises significantly the glass transition temperature of the polymer chain. In addition, intricate entanglement between very long polyolefins or between a crosslinking component and polyolefin causes quasi-crosslinking when the resin composition is kneaded, contributing to the curing of the film. Polyolefin with a long chain allows molecules to be entangled with each other at more points, and like the crosslinking, this is effective in increasing the heat resistance. The increase in the heat resistance also can be exhibited by an increase in a meltdown temperature in the shutdown measurement.

After the crosslinking treatment, the photoinitiator remaining unreacted and a low-molecular compound derived from the photoinitiator may be removed, if needed. As the method for the removal, a method in which they are washed with an appropriate solvent can be mentioned. The appropriate solvent means a solvent that does not swell or dissolve the resin component, such as polyolefin that composes the porous film. Specifically, there can be mentioned a hydrocarbon solvent with a low boiling point, a carbonized fluorine solvent, alcohols such as isopropanol and ethanol, and ketones such as acetone and methyl ethyl ketone, for example.

Preferably, a heat treatment for suppressing the degree of shrinkage is performed after the porous film is obtained by the vacuum ultraviolet ray irradiation and the crosslinking treatment. At this time, a 1-step heat treatment method, in which the heat treatment is completed at one time, may be used, or a multi-step heat treatment method, in which the heat treatment is performed at a low temperature first and then further is performed at a high temperature, may be used. Or a temperature-rising heat treatment method, in which the heat treatment is performed while the temperature is being raised, may be used. However, it is desirable that these treatments be performed without deteriorating the various properties, such as air permeability, that the porous film has originally. Preferably, the temperature for the heat treatment is 110° C. to 140° C., although it depends on the composition of the porous film. The heat treatment is performed for approximately 0.5 to 2 hours.

Preferably, the porous film thus obtained has a thickness of 1 μm to 60 μm, and more preferably 5 μm to 50 μm. Preferably, the porous film has a porosity of 20 vol % to 80 vol %, and more preferably 25 vol % to 75 vol %. Preferably, the porous film has a air permeability of 100 to 1000 seconds/100 cc, and more preferably 100 to 600 seconds/100 cc when measured by a method according to JIS P8117, for example. Preferably, the porous film has a shutdown temperature of 150° C. or lower, and more preferably 130° C. or lower. Preferably, the porous film has a mechanical strength of 1N or more, and more preferably 2N or more as a puncture strength, for example. As the method for measuring the puncture strength, a method described in the below-mentioned Example can be used.

The porous film of the present invention has an excellent shutdown function, excellent permeability, and excellent mechanical strength, and particularly has excellent resistance to film rupture at a high temperature. Use of the porous film as the separator for a non-aqueous electrolyte battery can enhance safety for various sizes and applications of the non-aqueous electrolyte battery.

The porous film of the present invention makes it possible to assemble a battery while the porous film is being interposed between the positive electrode and the negative electrode, as in the case of using a conventional separator. At this time, nothing special is required for the materials of the positive electrode, the negative electrode, a battery case, an electrolyte, etc. and the arrangement structure of these components. They may be the same as those conventionally used, and may be as described in JP 63 (1988)-205048 A, for example.

In the present embodiment, a cylindrical non-aqueous electrolyte battery 1 as shown in FIG. 1 is described as an example of the non-aqueous electrolyte battery of the present invention. In FIG. 1, hatching is omitted in part so that the figure can be viewed easily.

As shown in FIG. 1, in the non-aqueous electrolyte battery 1, a positive electrode 2, a negative electrode 3, a separator 4 (a separator for a non-aqueous electrolyte battery) disposed between the positive electrode 2 and the negative electrode 3 are wound integrally in a spiral form and accommodated in a closed-bottomed battery case 5. The separator 4 is the separator for a non-aqueous electrolyte battery composed of the porous film of the present invention. A positive electrode lead (not shown) connected to the positive electrode 2 is connected electrically to the battery case 5 via a lower insulating sleeve (not shown). In the figure, reference numeral 5a indicates a positive electrode terminal. A negative electrode tab 7 connected electrically to the negative electrode 3 is connected electrically to a negative electrode terminal 6a via an opening 8a of an upper insulating sleeve 8. An interior of the battery is filled with a nonaqueous electrolyte (not shown). The battery case 5 is closed by a lid 6 including the negative electrode terminal 6a, and a packing 9 closing a gap between the lid 6 and the battery case 5 so as not to allow the nonaqueous electrolyte to leak out of the battery. The separator 4 is impregnated with the electrolyte. Thus, an ion carrier moves between the positive electrode 2 and the negative electrode 3 sandwiching the separator 4 therebetween, allowing the separator 4 to charge and discharge as a secondary battery. In this example, two of the separators 4 are bonded to each other to make the form of a bag, and the negative electrode 3 is inserted therein and rolled together with the positive electrode 2. However, the separator 4 does not necessarily have to be in the form of a bag as long as the separator 4 is disposed between the mutually adjacent positive electrode 2 and the negative electrode 3 after being rolled.

EXAMPLES

The present invention will be described in more detail using Examples and Comparative Examples. The present invention is not limited to these Examples. Measurements of various properties were conducted as follows.

[Weight Average Molecular Weight]

The porous film was measured for weight average molecular weight at 135° C. by using a gel permeation chromatograph [GPC-150C] produced by Waters Corp., o-dichlorobenzene as the solvent, and a column [Shodex-80M] produced by Showa Denko K.K. The data was processed by a data collecting system produced by TRC. The molecular weight was calculated using polystyrene as a reference.

[Film Thickness]

The porous film was measured for thickness with a 1/10000 thickness gauge.

[Porosity]

The porous film to be measured was cut into a 6 cm-diameter circle and measured for volume (cm$^3$) and weight (g). Then, with the obtained results, the porosity was calculated by the following formula.

Porosity (vol %)=100×(volume (cm$^3$)–weight (g)/average density of component (g/cm$^3$))/volume (cm$^3$)

[Air Permeability]

The porous film was measured for air permeability according to JIS P8117.

[Puncture Strength]

A puncture strength test was conducted at a room temperature (25° C.) with a compression testing machine "KES-G5" produced by Kato Tech Co., Ltd. A maximum load was read from the load displacement curve obtained, and it was determined as a puncture strength. The needle used was one with a diameter of 0.5 mm and a curvature radius of 0.25 mm at the tip. The film was punctured with the needle at a speed of 2 cm/second.

[Gel Fraction]

The porous film cut into a 4 cm square was sandwiched by a folded 5 cm×10 cm metallic mesh to make a 5 cm×5 cm square sample. The sample was measured for initial weight (P0). Then the sample was immersed into 100 mL m-xylene (boiling point 139° C.). The xylene was boiled for 5 hours, and then the sample was taken out therefrom and dried. The dried sample was measured for weight (P1). Then, the gel fraction (R) was calculated by the following formula.

$R(\%)=100 \times P_1/P_0$

[Shutdown Temperature]

A cell with a φ 25 mm sealable tubular testing chamber made of SUS was used. A φ 20 mm platinum plate (1.0 mm in thickness) was used as a lower electrode, and a φ 10 mm platinum plate (1.0 mm in thickness) was used as an upper electrode. A test sample punched out into φ 24 mm was immersed in an electrolyte to be impregnated with the electrolyte, sandwiched between the electrodes, and set in the cell. A spring provided in the cell applied a constant plane pressure to each of the electrodes. The electrolyte used was one obtained by dissolving lithium borofluoride in a solvent obtained by mixing propylene carbonate and dimethoxyethane at a capacity ratio of 1:1, so that the concentration of lithium borofluoride was 1.0 mol/L. A thermocouple thermometer and an ohm-meter were connected to the cell so that the temperature and the resistance can be measured. The cell was put in an incubator set at 180° C., and the temperature and the resistance were measured. The average rate of temperature increase from 100° C. to 150° C. was 10° C./minute. Based on this measurement, the temperature at which the resistance reached 100 Ω·cm$^2$ was determined as the shutdown temperature.

[Heat and Film Rupture Resistance Test]

The porous film cut into a 14 cm square was fixed to a predetermined jig for film rupture test (a cutout frame with a size of 10 cm-square outside and 7 cm-square inside) by using a perimeter clip, and then put in a dryer set at 160° C. The time (minute) taken for the porous film to rupture was measured.

Example 1

17 parts by weight of a resin composition composed of 3 wt % of an EPDM resin (Esprene 5527F, produced by Sumitomo Chemical Co., Ltd.), 32 wt % of maleic anhydride-modified PE with a weight average molecular weight of 250,000 (AD-TEX ER403A produced by Japan Polyethylene Corp.), and 65 wt % of ultra high molecular weight polyethylene with a weight average molecular weight of 1 million (melting point 137° C.) were mixed uniformly with 83 parts by weight of liquid paraffin into a slurry state, melt-kneaded by a twin-screw extruder at a temperature of 160° C., and then extrusion-molded into a 4 mm-thick sheet. The molded product was taken out under a constant tension, cold-molded once by a roller that had been cooled in 10° C. cooling water, and then pressed by a belt press machine set at a temperature of 120° C. to produce a 1 mm-thick resin sheet. Thereafter, the resin sheet was stretched biaxially, 4.0 times in the machine direction and 4.0 times in the traverse direction at the same time, at a temperature of 123° C. and at a speed of 10 mm/sec to produce a stretched film. The liquid paraffin was removed from the stretched film by using heptane. Then, one surface of the stretched film was irradiated with an Xe$_2$ excimer UV lamp (oscillation wavelength 172 nm) under the conditions in which the irradiation intensity was 14 mW/cm$^2$ and the irradiation time was 1 minute (the amount of irradiation was 840 mJ/cm$^2$), using a vacuum ultraviolet ray excimer light irradiation apparatus (produced by Ushio Inc.) The stretched film that had been irradiated with the vacuum ultraviolet ray was immersed in a heptane solution containing 0.2% of benzophenone, and dried immediately thereafter. Then, a surface of the stretched film opposite to the excimer-treated surface was irradiated with an ultraviolet ray for 2 seconds by using a high pressure mercury vapor lamp (light-emitting wavelength 240 nm to 400 nm, 12 kW, produced by Ushio Inc.). Thereafter, the stretched film that had been subjected to the crosslinking treatment was put in a thermostatic bath set at 125° C., and heat-treated for 2 hours while being exposed to an air flow. Thus, the porous film was produced.

Example 2

The porous film was produced by the same method as that of the Example 1, except for that 3 wt % of a polynorbornene resin (Norsorex NB produced by Zeon Corp.) was used instead of the 3 wt % of EPDM resin.

Example 3

The porous film was produced by the same method as that of the Example 1, except for that 3 wt % of the polynorbornene resin (Norsorex NB produced by Zeon Corp.) was used instead of the 3 wt % of EPDM resin, 16 wt % of an olefin thermoplastic elastomer (TPE821 produced by Sumitomo Chemical Co., Ltd.) was used instead of the 32 wt % of maleic anhydride-modified PE with a weight average molecular weight of 250,000, and the content of the ultra high molecular weight polyethylene with a weight average molecular weight of 1 million was changed from 65 wt % to 81 wt %.

Comparative Example 1

The porous film was produced by the same method as that of the Example 1, except for that one surface of the stretched film was not irradiated with the Xe$_2$ excimer UV lamp.

Comparative Example 2

The porous film was produced by the same method as that of the Example 1, except for that the stretched film was irradiated with a KrCl excimer laser (oscillation wavelength 222 nm) instead of the Xe$_2$ excimer UV lamp.

Comparative Example 3

The porous film was produced by the same method as that of the Example 1, except for that the stretched film was irradiated with an electron beam (min-EB, accelerating voltage 50 kV, dose 150 kGy, produced by Ushio Inc.)

Table 1 shows the results of the evaluations on the porous films obtained in the Examples 1 to 3 and the Comparative Examples 1 to 3, made by the above-mentioned methods.

TABLE 1

| | Example 1 | Example 2 | Example 3 | C. Example 1 | C. Example 2 | C. Example 3 |
|---|---|---|---|---|---|---|
| Thickness (μm) | 18 | 18 | 18 | 19 | 18 | 19 |
| Porosity (%) | 45 | 48 | 42 | 51 | 49 | 47 |
| Air permeability (second/100 cc) | 470 | 350 | 490 | 370 | 436 | 472 |
| Puncture strength (N) | 3.1 | 3.1 | 4.1 | 3.1 | 1.5 | 1.4 |
| Gel fraction (%) | 41 | 63 | 39 | 48 | 64 | 53 |
| Shutdown temperature (° C.) | 128 | 129 | 127 | 135 | 139 | 130 |
| Film ruptured in: (minute) | 60 | 60 | 60 | 60 | 60 | 5 |

As shown in the results of Table 1, the porous film of the present invention has all of satisfactory shutdown properties, high heat resistance and high strength, and suitably can be used as the separator for a battery.

Figure 2:
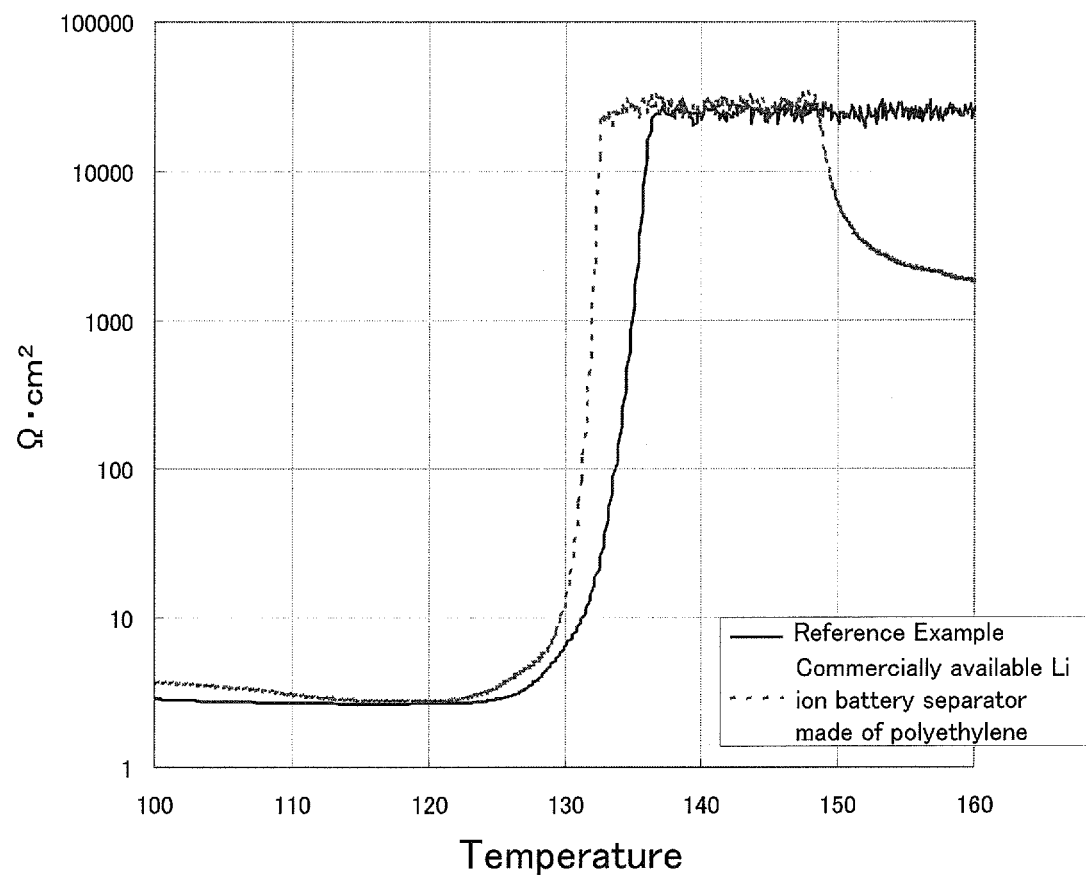
FIG. 2 is a graph showing the results of shutdown measurements made on a porous film as a reference example and a commercially available battery separator.

Reference Example 15 wt % of ultra high molecular weight polyethylene with a weight average molecular weight of 1 million (melting point 137° C.) was mixed uniformly with 85 parts by weight of liquid paraffin into a slurry state, melt-kneaded by the twin-screw extruder at a temperature of 160° C., and then extrusion-molded into a 1.5 mm-thick sheet. The molded product was taken out under a constant tension, and cold-molded once by a roller that had been cooled in 10° C. cooling water to produce a resin sheet. Then, the resin sheet was stretched biaxially, 5.0 times in the machine direction and 4.5 times in the traverse direction at the same time, at a temperature of 124° C. to produce a stretched film. The liquid paraffin was removed from the stretched film by using decane. The stretched film was put in the thermostatic bath set at 128° C., and heat-treated for 2 hours while being exposed to an air flow. Thus, the porous film was produced. In order to prove that the entanglement between the molecules of ultra high molecular weight polyolefin increases the heat resistance, a shutdown measurement was conducted on the porous film and a commercially available lithium ion battery separator made of polyethylene (25 μm in thickness, porosity 39%, gurley number 600 sec/dL, and puncture strength 3.2 N) to observe the effect. As shown in FIG. 2, the resistance decreased with the commercially available separator due to meltdown at a temperature close to but lower than 150° C. However, a decrease in resistance due to meltdown was not observed with the porous film that had been formed as mentioned above even when the temperature exceeded 170° C.

Example 4

The stretched film was produced by the same method as that of the reference example, and then one surface of the stretched film was irradiated with an Xe$_2$ excimer laser (oscillation wavelength 172 nm) at a room temperature by using the vacuum ultraviolet ray excimer light irradiation apparatus (produced by Ushio Inc.), under the conditions in which the irradiation intensity was 11 mW/cm$^2$ and the irradiation time was 30 seconds (the amount of irradiation was 330 mJ/cm$^2$).

Example 5

The porous film was produced by the same method as that of the Example 4, except for that one surface of the stretched film was irradiated with a $Kr_2$ excimer UV light (oscillation wavelength 140 nm) instead of the $Xe_2$ excimer UV light, under the conditions in which the irradiatin intensity was 20 $mW/cm^2$ and the irradiation time was 5 seconds (the amount of irradiation was 100 $mJ/cm^2$).

Comparative Example 4

The porous film was produced by the same method as that of the Example 4, except for that one surface of the stretched film was not irradiated with the $Xe_2$ excimer UV light.

Example 6

15 wt % of ultra high molecular weight polyethylene (melting point 137° C.) with a weight average molecular weight of 1 million was mixed uniformly with 85 parts by weight of liquid paraffin into a slurry state, melt-kneaded by the twin-screw extruder at a temperature of 160° C., and then extrusion-molded into a 1 mm-thick sheet. The molded sheet product was taken out under a constant tension, and cold-formed once by a roller that had been cooled in 10° C. cooling water to produce a resin sheet. Then, the resin sheet was stretched biaxially, 5.0 times in the machine direction and 4.5 times in the traverse direction at the same time, at a temperature of 124° C. to produce a stretched film. The liquid paraffin was removed from the stretched film by using decane. The stretched film was put in the thermostatic bath set at 127° C., and heat-treated for 2 hours while being exposed to an air flow. Thus, the porous film was produced. Thereafter, one surface of the stretched film was irradiated with an $Xe_2$ excimer laser (oscillation wavelength 172 nm) under the conditions in which the irradiation intensity was 11 $mW/cm^2$ and the irradiation time was 30 seconds (the amount of irradiation was 330 $mJ/cm^2$), using the vacuum ultraviolet ray excimer light irradiation apparatus (produced by Ushio Inc.)

Comparative Example 5

The porous film was produced by the same method as that of the Example 6, except for that one surface of the stretched film was not irradiated with the $Xe_2$ excimer UV light.

Each of the porous films of the Examples 4 to 6 and the Comparative Examples 4 and 5 that had been formed as mentioned above was measured for thickness, porosity, air permeability, puncture strength, and shutdown temperature by the above-mentioned methods. Table 2 shows the results thereof.

TABLE 2

|  | Example 4 | Example 5 | C. Example 4 | Example 6 | C. Example 5 |
| --- | --- | --- | --- | --- | --- |
| Thickness (μm) | 16 | 16 | 16 | 12 | 12 |
| Porosity (%) | 37 | 36 | 38 | 42 | 42 |
| Air permeability (second/100 cc) | 240 | 230 | 230 | 150 | 155 |
| Puncture strength (N) | 1.7 | 1.6 | 1.7 | 1.2 | 1.3 |
| Shutdown temperature (° C.) | 130 | 131 | 134 | 127 | 131 |

The results shown in Table 2 prove that the porous films of the Examples 4 to 6 produced by irradiating the stretched film with the vacuum ultraviolet ray have a lower shutdown temperature and more enhanced shutdown properties than those of the porous film of the Reference Example. Also, comparisons between the Example 4 and the Comparative Example 4 and between the Example 5 and the Comparative Example 4, and a comparison between the Example 6 and the Comparative Example 5 prove that the irradiation with a vacuum ultraviolet ray can enhance the shutdown function without deteriorating other properties such as mechanical strength.

From the above-mentioned results, the method of the present invention, in which the porous film is produced by irradiating the stretched film with a vacuum ultraviolet ray, can provide the porous film that has an excellent shutdown function, excellent heat resistance, and excellent mechanical strength and is easy to make thinner.

INDUSTRIAL APPLICABILITY

The porous film of the present invention exhibits satisfactory shutdown properties while maintaining strength, and preferably can be used as a separator for a battery.

The invention claimed is:

1. A method for producing a porous film treated with ultraviolet ray, comprising:
   producing a stretched porous film by a process comprising:
      stretching a resin sheet comprising, with respect to a total resin content in the resin sheet, 10 wt % to 90 wt % of ultra high molecular weight polyethylene with a weight average molecular weight of 800,000 or more, and 10 wt % to 90 wt % of at least one resin selected from the group consisting of polyolefins with a weight average molecular weight of 500,000 or less, thermoplastic elastomer, and a graft copolymer; and
      removing solvent so as to form a porous structure in the porous film; and
   then irradiating the stretched porous film with a vacuum ultraviolet ray,
   wherein the vacuum ultraviolet ray is irradiated directly on the stretched porous film, and
   the porous film is a one-layer film.

2. The method for producing the porous film treated with ultraviolet ray according to claim 1, wherein an $Xe_2$ excimer UV lamp is used as a light source for the irradiation with the vacuum ultraviolet ray.

3. The method for producing the porous film treated with ultraviolet ray according to claim 1, wherein the resin sheet further contains a polymer with a double bond.

4. The method for producing the porous film treated with ultraviolet ray according to claim 1, wherein an amount of irradiation with the vacuum ultraviolet ray is 100 to 5000 $mJ/cm^2$.

5. The method for producing a porous film treated with ultraviolet ray according to claim 1,
   wherein the step of removing the solvent is carried out after the step of stretching the resin sheet.

6. The method for producing a porous film according to claim 1, wherein the porous film irradiated with the ultraviolet ray has a shutdown temperature of 150° C. or lower and a puncture strength of 1N or more.

7. The method for producing the porous film treated with ultraviolet ray according to claim 1, wherein the ultra high molecular weight polyethylene has a weight average molecular weight of 1 million or more.

* * * * *